United States Patent [19]

Roberts, Sr.

[11] Patent Number: 4,641,453

[45] Date of Patent: Feb. 10, 1987

[54] FISHING ROD HOLDER HAVING INTEGRAL ALARM AND MOUNTING STRUCTURE

[76] Inventor: Joseph M. Roberts, Sr., P.O. Box 2383, Alameda, Calif. 94501

[21] Appl. No.: 777,095

[22] Filed: Sep. 18, 1985

[51] Int. Cl.⁴ ............................................. A01K 77/12
[52] U.S. Cl. ........................................... 43/17; 43/21.2
[58] Field of Search ............................ 43/21.2, 16, 17

[56] References Cited

U.S. PATENT DOCUMENTS

| | | | |
|---|---|---|---|
| 2,908,099 | 5/1958 | Burke | 43/16 |
| 3,888,034 | 6/1975 | McGuire | 43/17 |
| 4,004,365 | 1/1977 | Manchester | 43/17 |
| 4,202,125 | 5/1980 | Kovacs | 43/17 |
| 4,202,126 | 5/1980 | Pientrenka | 43/17 |
| 4,217,720 | 8/1980 | Karr | 43/17 |

FOREIGN PATENT DOCUMENTS 8300363  8/1984  Netherlands ..................... 43/21.2

Primary Examiner—Nicholas P. Godici
Assistant Examiner—Karen Skillman
Attorney, Agent, or Firm—Flehr, Hohbach, Test, Albritton & Herbert

[57] ABSTRACT

A fishing rod holder including a holster portion, a mount pivotally attached to the holster portion and including a first bolt extending from the mount with a bracket engaging the first bolt, and an alarm integral with the holster portion and including a switch which is actuated by the pivoting of the holster portion on the mount in response to the pull of a fish. A strap is provided on the holster portion and is positionable for retaining either a conventional rod and reel or a rod with a spinning reel. The mount includes a second bolt which extends into the arm and engages the switch upon pivoting of the holster portion. A spring is positioned on the second bolt for yieldably separating the second bolt and the switch thereby adjusting the force required to actuate the switch. The holster portion includes a first cylindrical portion having an open side for supporting a rod and a second cylindrical portion having an open side for engaging a handle of the rod, the first and second cylindrical portions being integral with the open sides being displaced by 180°. A ground spike is provided and threadably engages the first bolt for mounting the fishing rod holder on the ground. The ground spike is configured for reception in the first cylindrical portion when not in use. The mount and bracket can provide gunwale, turret, rail, and clamp attachment.

6 Claims, 8 Drawing Figures

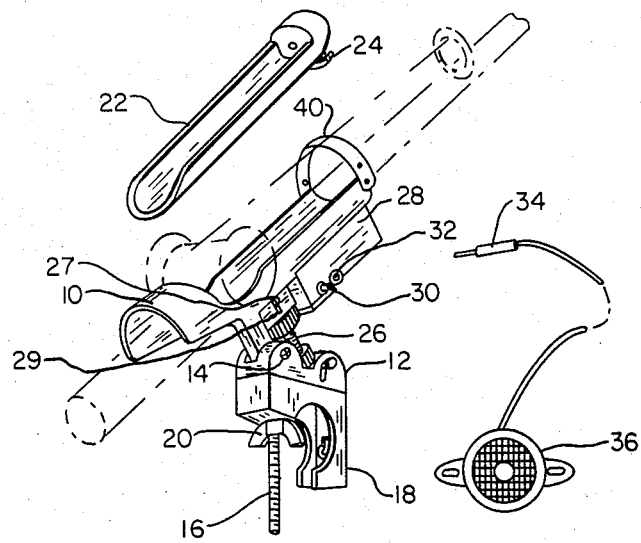
FIG. —1
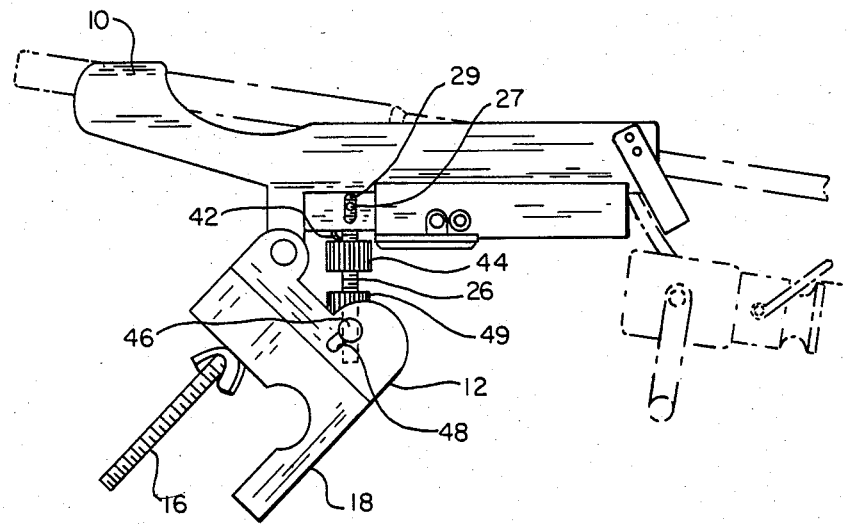
FIG. —2

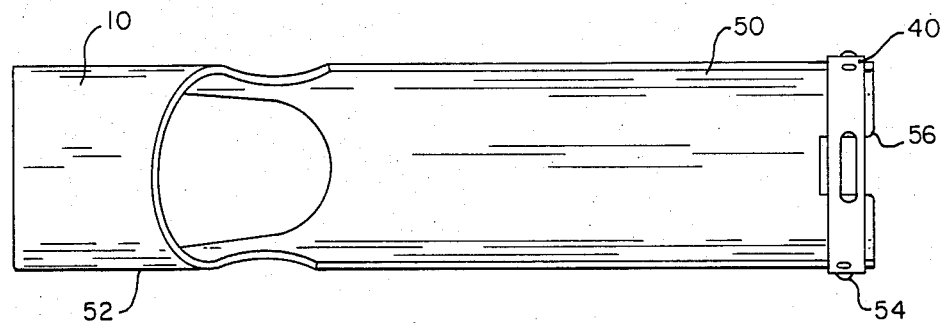
FIG. — 3
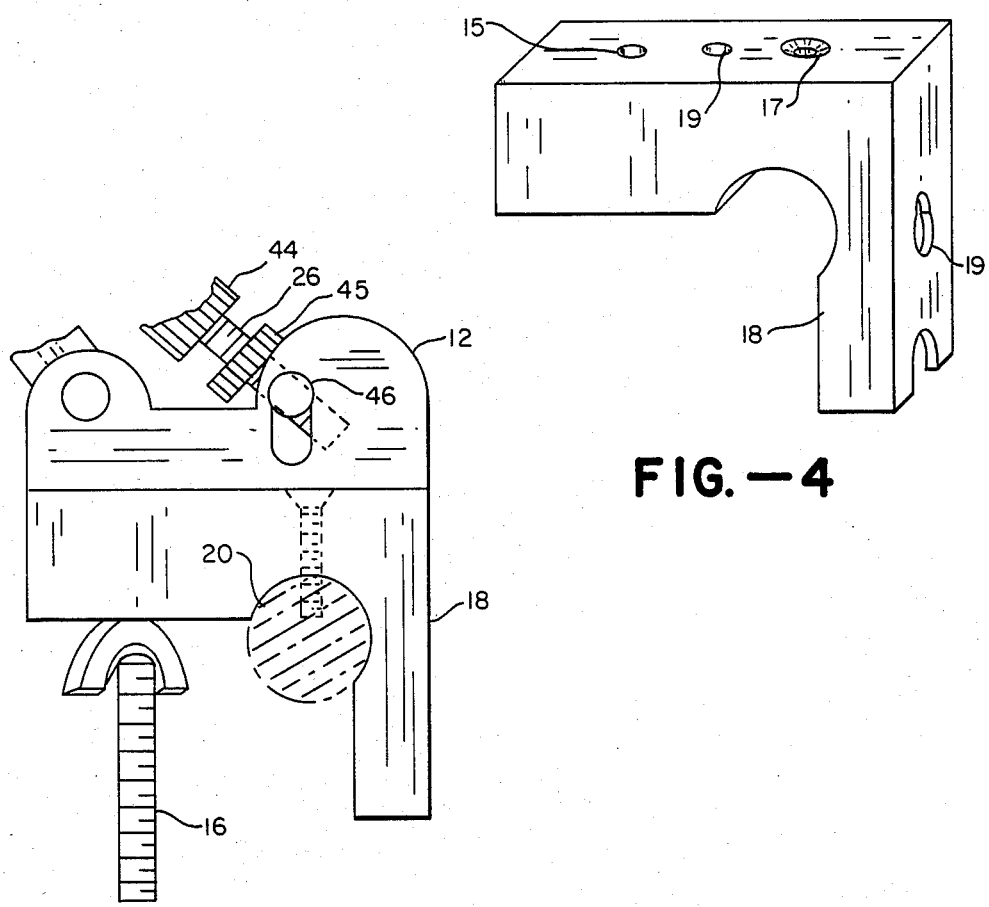
FIG. — 4
FIG. — 5

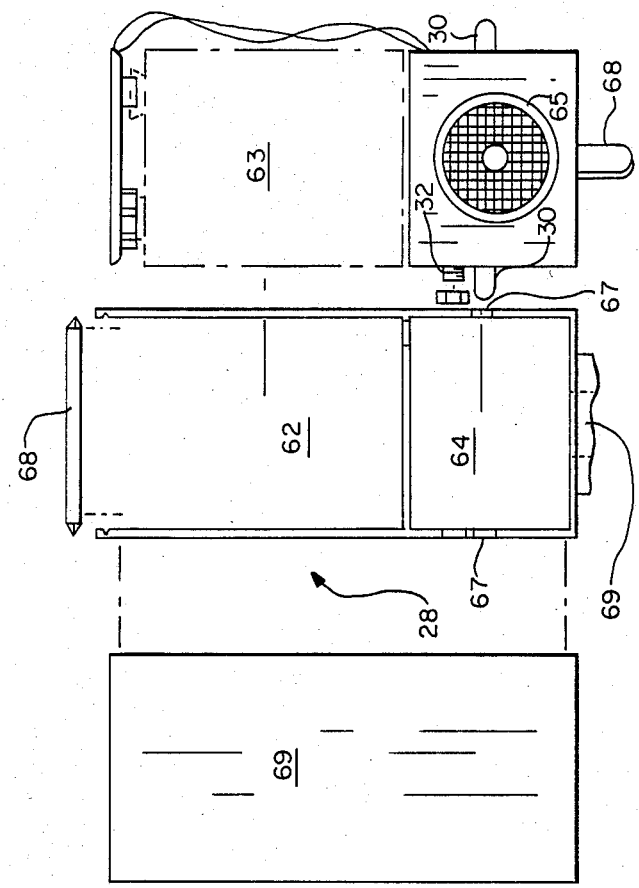
FIG.—8
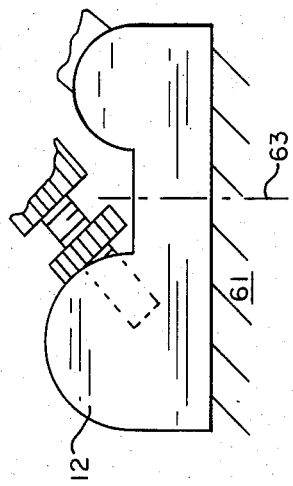
FIG.—7
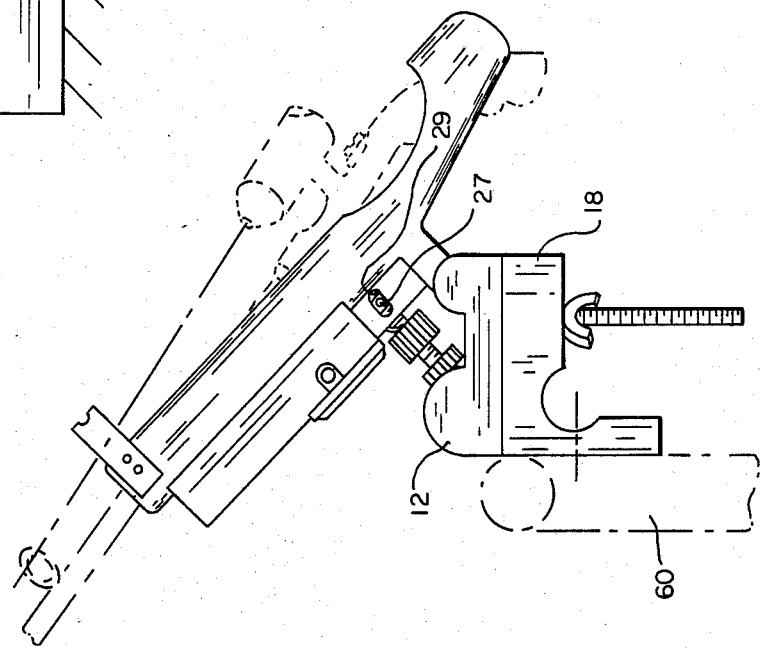
FIG.—6

FISHING ROD HOLDER HAVING INTEGRAL ALARM AND MOUNTING STRUCTURE

This invention relates generally to fishing equipment, and more particularly the invention relates to a fishing rod holder and alarm.

My U.S. Pat. No. 4,398,185 discloses a simple and rugged fishing alarm for attaching on a fishing rod and responding to the pull of a fish on the fishing line. Prior art cited during prosecution of the patent application disclose alarm devices built into fishing rod holders. Attention is directed specifically to Karr U.S. Pat. No. 4,217,720; Kovacs U.S. Pat. No. 4,202,125; and Pietreinka U.S. Pat. No. 4,202,126 in which alarms are actuated by the pivoting of the fishing rod mounted in the holder. Also known are fishing rod holders specifically designed for mounting on fishing boats.

The present invention is directed to an improved and versatile fishing rod holder including a holster which readily accommodates both conventional casting rods and reels and rods with spinning reels. A mount is provided which can provide gunwale, turret, rail, and clamp attachment. An audio and visual alarm means integral with the holster responds to pivoting of the holster on the mount. Tension adjustment and pivot angle adjustment are provided in the holster and mount. Another feature of the invention is a ground spike which is readily attached to the fishing rod holder and which is stored in the holster when the holder is not in use.

Importantly, the fishing rod holder in accordance with the invention is designed for economy of manufacture.

The invention and objects and features of the invention will be more readily apparent from the following detailed description and appended claims when taken with the drawing, in which:

FIG. 1 is an exploded perspective view of one embodiment of a fishing rod holder in accordance with the invention.

FIG. 2 is a side view of the fishing rod holder of FIG. 1.

FIG. 3 is a top view of the holster portion of the fishing rod holder of FIG. 1.

FIG. 4 is a perspective view of the bracket member of the fishing rod holder of FIG. 1.

FIG. 5 is a side view of the mount portion of the fishing rod holder of FIG. 1 illustrating a rail attachment.

FIGS. 6 and 7 are side views of the fishing rod holder of FIG. 1 showing a turret mount and a gunwale mount.

FIG. 8 is an exploded view of alarm means in the fishing rod holder of FIG. 1.

Referring now to the drawings, FIG. 1 is a partially exploded view of a fishing rod holder in accordance with one embodiment of the invention. The holder includes a holder portion shown generally at 10 for receiving and supporting a rod and reel, a mount portion 12 which is pivotally attached to the holster portion by means of a screw 14. The mount portion 12 includes a first bolt 14 extending therefrom, and a bracket 18 is mounted on the bolt 16 by means of a wingnut 20. As will be described further hereinbelow, the bracket 18 and mount 12 cooperatively function for mounting the fishing rod holder by clamping, turrent mount, gunwale mount, and rail mount. Additionally, a ground spike 22 is provided for threadably engaging bolt 16 and mounting the fishing rod holder in the ground. When the fishing rod holder is not in use, the spike 22 is disengaged from bolt 16 and is configured for storage in the holster portion 10. Spike 22 includes a tongue portion 24 which engages a groove in the holster portion 10 as will be described in FIG. 3.

Extending from the mount 12 is a second bolt 26 which extends into alarm means 28 integral with the holster portion 10. One end of bolt 26 engages a switch in the alarm means 28 whereby the pivoting of the holster portion 10 on mount 12 in response to the pull of a fish actuates an audio and visual alarm including light 30. Bolt 26 is maintained in the alarm housing by means of a pin 27 which is movable in a slot 29 in the housing wall. The alarm portion will be described in more detail with reference to FIG. 6. A jack 32 and plug 34 interconnect an alarm 36 for remote monitoring.

In accordance with one feature of the invention, the mount 10 includes a strap 40 which extends over the casting rod and reel shown in dotted form in FIG. 1 and FIG. 5 and which extends under the rod for a spinning rod and reel as shown in FIG. 2. Thus all conventional rods and reels are accommodated by the fishing rod holder in accordance with the invention.

FIG. 2 is a side view of the fishing rod holder of FIG. 1 and further illustrates the second bolt 26 which extends from the mount 12 into the alarm housing 28 in the holster portion 10. A spring 42 is provided between a nut 44 and the housing of the alarm to adjust the pull pressure necessary in actuating the alarm. One end of the second bolt 26 threadably receives a screw 46 positioned in a slot 48. The positioning of the screw 46 in the slot 48 adjusts the pivot angle of the holster portion 10 with respect to the mount 12. A second nut 49 engages mount 12 and cooperates with screw 46 to maintain the desired pivot angle.

FIG. 3 is a top view of the holster portion 10 which comprises a first cylindrical portion 50 having an open side for receiving a rod, and a second cylindrical portion 52 having an open side for receiving a handle of the rod. The first and second cylindrical portions are integral and are preferably made of injection molded plastic with the open sides of the first and second cylindrical portions being displaced by 180°. The strap 40 is provided on one end of the holster 10 and snaps on a pin 54 extending from one side of the holster. Thus the strap 40 can be positioned above or below a rod as necessary to maintain the rod and reel in the holster 10. Formed in the end of cylindrical portion 50 beneath strap 40 is a slot 56 which receives the tongue portion 24 of the spike 22 in FIG. 1.

FIG. 4 is a perspective view of the bracket 18 showing hole 15 for receiving bolt 16 and countersunk hole 17 and holes 19 for mounting the bracket 18.

FIG. 5 is a side view of the mount portion showing the bracket 18 fastened to rail 20 by means of a screw in countersunk hole 17 in FIG. 4. FIG. 6 is another side view of the fishing rod holder of FIG. 1 with the clamp 18 fastened to bulkhead 60 with the mount 12 being rotatable on clamp 18. In this embodiment a pistol grip type rod is positioned in the holster with the handle portion of the rod extending through the open side of cylindrical portion 52 as shown in FIG. 3 In FIG. 7 the mount 12 is fastened directly to gunwale 61 by means of a fastener inserted along center line 63.

FIG. 8 is an exploded plan view of the alarm portion 28. The alarm portion includes a first cavity 62 for receiving a battery 63 and a second cavity 64 for receiving a buzzer 65. Extending from either side of the buzzer 65 are lights 66 which extend from the cavity 64 through slots 67. A switch 68 comprising two separated leafs extend out of slot 69 and are engaged by the bolt 26 upon pivoting of the holster on the mount and thereby completing the electrical circuit between the battery and the lights 30 and buzzer 65. Cover 68 slidably mates with cavity 62 to maintain the battery 63 in place. Buzzer 65 preferably has a press fit in cavity 64. A second cover 69 is permanently attached such as by glue to enclose the tops of cavities 62, 64.

The fishing rod holder in accordance with the invention provides a large range of rod height angle adjustment and finger tip sensitivity in actuating the alarm. The holder accommodates all conventional styles of rod and reel and is readily mounted for use. The holder is preferably manufactured using injection molded plastic thereby producing a lightweight, tough, non-corrosive, and economical unit.

While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. A fishing rod holder comprising
    a holster portion for receiving and holding a rod,
    alarm means integral with said holster portion and including a switch which is actuated by pivoting of said holster portion on a mount means in response to the pull of a fish,
    mount means including a mount member pivotally attached to said holster portion, a first bolt extending from said mount member, and bracket means engaging said first bolt, a second bolt, said second bolt extending into said alarm means and engaging said switch upon pivoting of said holster portion and,
    spring means positioned about said second bolt and engaging said alarm means for yieldably separating said second bolt and said switch and thereby adjusting force required to actuate said alarm means.

2. The fishing rod holder as defined by claim 1 wherein said holster portion includes strap means positionable for retaining a rod and spinning reel in said holster portion and for retaining a conventional rod and reel in said holster portion.

3. A fishing rod holder as defined by claim 1 wherein said holster portion includes a first cylindrical portion having an open side for supporting a rod and a second cylindrical portion having an open side for engaging a handle of the rod, said first and second cylindrical portions being integral with the open sides of said first and second cylindrical portions being axially displaced by 180°.

4. The fishing rod holder as defined by claim 3 and further including a ground spike for threadably engaging said bolt and mounting said fishing rod holder on the ground, said ground spike configured for reception in said first cylindrical portion when not in use.

5. A fishing rod holder as defined by claim 4 wherein said ground spike includes a tongue portion and said first cylindrical portion includes a groove for receiving said tongue portion.

6. The fishing rod holder as defined by claim 1 and further including screw means threadably engaging said second bolt for adjusting the pivot angle of said holster portion from said mount means.

* * * * *